United States Patent
Agarwal et al.

(10) Patent No.: US 9,612,946 B2
(45) Date of Patent: *Apr. 4, 2017

(54) USING LINKED DATA TO DETERMINE PACKAGE QUALITY

(71) Applicant: International Business Machines Corporation, Armonk, NY (US)

(72) Inventors: Saurabh Agarwal, Cary, NC (US); Sheehan Anderson, Morrisville, NC (US); Gili Mendel, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,303

(22) Filed: Feb. 3, 2016

(65) Prior Publication Data

US 2016/0154730 A1  Jun. 2, 2016

Related U.S. Application Data

(63) Continuation of application No. 14/066,957, filed on Oct. 30, 2013, now Pat. No. 9,256,520, which is a (Continued)

(51) Int. Cl.
| G06F 11/00 | (2006.01) |
| G06F 11/36 | (2006.01) |
| G06F 9/44  | (2006.01) |

(52) U.S. Cl.
CPC ........... *G06F 11/3688* (2013.01); *G06F 8/70* (2013.01); *G06F 11/3612* (2013.01); *G06F 11/3684* (2013.01); *G06F 11/3692* (2013.01)

(58) Field of Classification Search
USPC .................................. 714/37; 717/100, 124
See application file for complete search history.

(56) References Cited

U.S. PATENT DOCUMENTS 7,506,312 B1 * 3/2009 Girolami-Rose ......... G06F 8/71
                                                      717/101
7,778,866 B2    8/2010 Hughes
                (Continued)

OTHER PUBLICATIONS

Douglass, B.P. et al., "IBM Rational Workbench for Systems and Software Engineering", [online] IBM Redpapers, Redbook—REDP-4681-00, Jun. 30, 2010, retrieved from the Internet: <www.redbooks.ibm.com/redpapers/pdfs/redp4681.pdf>, 26 pgs.

(Continued)

*Primary Examiner* — Kamini Patel
(74) *Attorney, Agent, or Firm* — Cuenot, Forsythe & Kim, LLC

(57) ABSTRACT

Arrangements described herein relate to determining a quality of a software package. Via linked data, the software package can be linked to at least one test plan and a requirement collection. The software package can be executed in accordance with the test plan using at least one test case. At least one test result of the execution of the software package can be generated. A score can be assigned to the test result and a score can be assigned to the test based at least on the test result. Based at least the scores on assigned to the test result and the test case, a package quality score can be assigned to the software package.

6 Claims, 3 Drawing Sheets

Related U.S. Application Data continuation of application No. 13/777,520, filed on Feb. 26, 2013, now Pat. No. 9,256,519.

(56) References Cited

U.S. PATENT DOCUMENTS

| | | | |
|---|---|---|---|
| 7,788,632 B2 | 8/2010 | Kuester et al. | |
| 8,230,265 B2 | 7/2012 | Rajashekara et al. | |
| 8,620,702 B2 | 12/2013 | Mehta | |
| 9,256,519 B2* | 2/2016 | Agarwal | G06F 11/3692 |
| 9,256,520 B2* | 2/2016 | Agarwal | G06F 11/3692 |
| 2007/0033441 A1 | 2/2007 | Sathe et al. | |
| 2007/0250378 A1 | 10/2007 | Hughes et al. | |
| 2007/0288107 A1* | 12/2007 | Fernandez-Ivern | G06Q 10/00 700/91 |
| 2010/0063859 A1 | 3/2010 | Mehta | |
| 2010/0131497 A1* | 5/2010 | Peterson | G06Q 10/06 707/722 |
| 2010/0262473 A1 | 10/2010 | Hughes | |
| 2011/0246834 A1* | 10/2011 | Rajashekara | G06F 11/3676 714/38.1 |
| 2014/0081700 A1* | 3/2014 | Mehta | G06Q 10/06 705/7.28 |
| 2014/0245067 A1* | 8/2014 | Agarwal | G06F 11/3692 714/38.1 |
| 2014/0245068 A1* | 8/2014 | Agarwal | G06F 11/3692 714/38.1 |
| 2016/0140017 A1* | 5/2016 | Agarwal | G06F 11/3692 714/38.1 |

OTHER PUBLICATIONS

U.S. Appl. No. 13/777,520, Non-Final Office Action, Aug. 14, 2014, 11 pg.
U.S. Appl. No. 13/777,520, Final Office Action, Jan. 23, 2015, 13 pg.
U.S. Appl. No. 13/777,520, Advisory Action, Mar. 23, 2015, 5 pg.
U.S. Appl. No. 13/777,520, Non-Final Office Action, Apr. 1, 2015, 18 pg.
U.S. Appl. No. 13/777,520, Final Office Action, Jul. 30, 2015, 7 pg.
U.S. Appl. No. 13/777,520, Notice of Allowance, Oct. 14, 2015, 5 pg.
U.S. Appl. No. 14/066,957, Final Office Action, Jan. 21, 2015, 16 pg.
U.S. Appl. No. 14/066,957, Advisory Action, Mar. 20, 2015, 6 pg.
U.S. Appl. No. 14/066,957, Non-Final Office Action, Apr. 3, 2015, 19 pg.
U.S. Appl. No. 14/066,957, Final Office Action, Jul. 31, 2015, 7 pg.
U.S. Appl. No. 14/066,957, Notice of Allowance, Oct. 15, 2015, 5 pg.
U.S. Appl. No. 14/066,957, Non-Final Office Action, Aug. 19, 2014, 13 pg.

* cited by examiner

USING LINKED DATA TO DETERMINE PACKAGE QUALITY

BACKGROUND

Arrangements described herein relate to the use of software packages.

Software packages are a collection of computer program code, such as a piece of application or utility software, a collection of application or utility software, or a software suite. Oftentimes a software package includes program code assembled to perform a particular task, but this is not always the case. Sometimes a software package includes program code assembled to perform multiple tasks.

Software packages oftentimes are distributed for use in various different applications or utilities. Indeed, the distribution of software packages is commonplace in software design. For example, a software package including program code that functions as a random number generator can be distributed for use by any of a variety of applications or utilities that require a random number generator. This is but one example; virtually countless other software packages currently are available in the software community.

BRIEF SUMMARY

One or more embodiments disclosed within this specification relate to using linked data to determine package quality.

An embodiment can include a method of determining a quality of a software package. The method can include linking, via linked data, the software package to at least one test plan and a requirement collection. The method also can include executing the software package in accordance with the test plan using at least one test case. The method further can include generating at least one test result of the execution of the software package. The method further can include assigning, based at least on the test result, a score to the test result and a score to the test case. The method further can include, based at least the scores on assigned to the test result and the test case, via a processor, assigning a package quality score to the software package.

DETAILED DESCRIPTION

Figure 1:
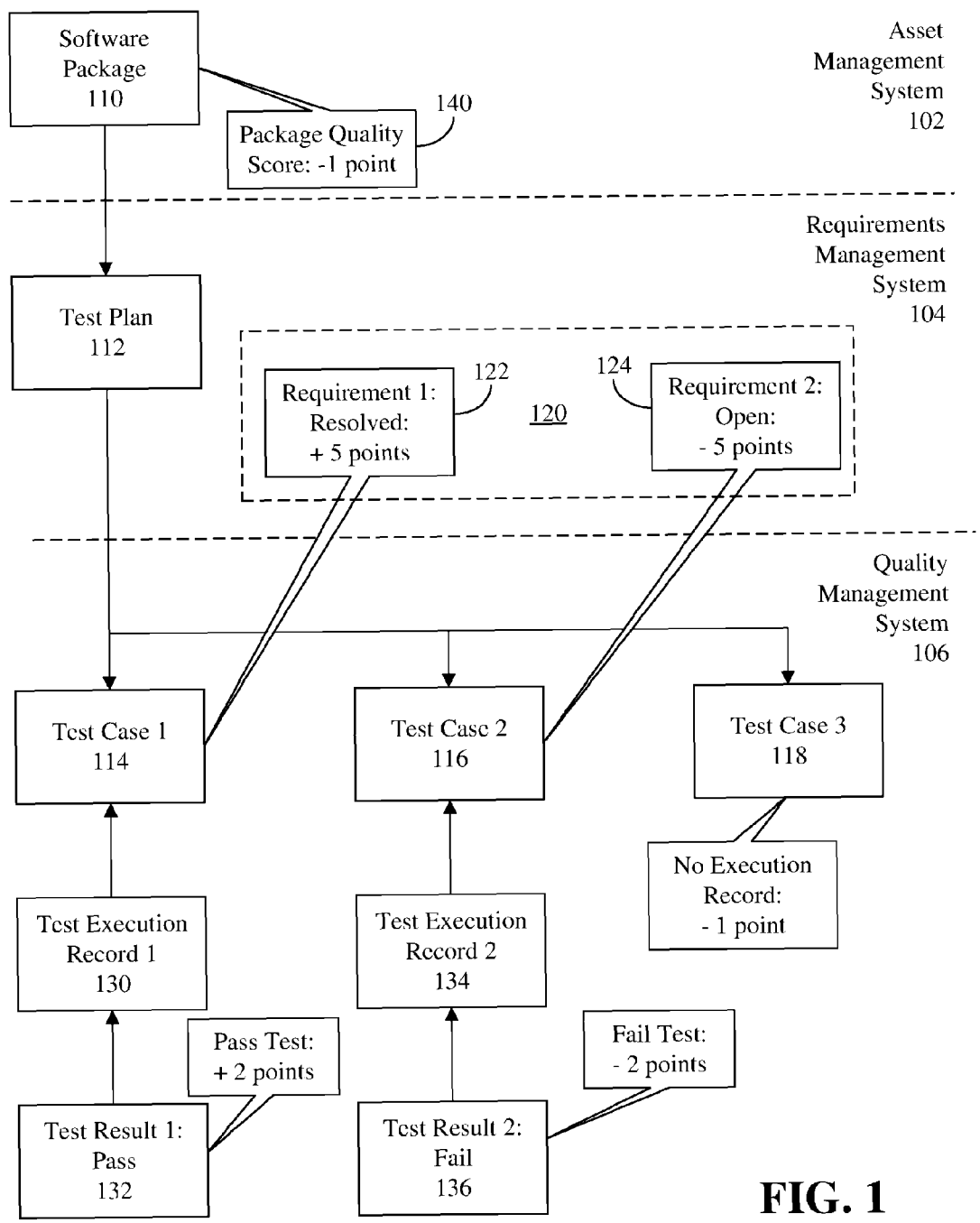
FIG. 1 is a block diagram illustrating a system for determining a quality of a software package in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to using linked data to determine a quality of a software package. The software package can be linked to a variety of other resources, such as build automation information, a test plan, a requirement collection, etc., using linked data. Further, using the linked data, based on the test plan, the software package can be executed using one or more test cases. The test cases can correspond to the requirement collection, which can specify a collection of requirements for the software package. In this regard, each test case can be configured to test whether the software package satisfies one or more of the requirements. Records of the test execution can be generated, and such records can indicate test results, for example whether execution of the build using the test cases passed or failed. Based on test execution records, a package quality score can be assigned to the software package, as will be described herein.

Several definitions that apply throughout this document will now be presented.

As used herein, the term "linked data" means a method of publishing structured data so that it can be interlinked. The use of linked data builds upon standard Web technologies such as Hypertext Transfer Protocol (HTTP) and uniform resource identifiers (URIs), but rather than using HTTP and URIs to serve web pages for human readers, linked data extends the use of HTTP and URIs to share information in a way that can be read automatically by computers. This enables data from different sources to be easily connected and queried.

As used herein, the term "software package means" a piece of application or utility software, or a collection of application and/or utility software. Examples of software packages include entire applications, entire utilities, and components of applications and/or utilities. For instance, a library (e.g., a dynamic-link library (DLL)) is an example of a software package. An application program interface (API) is another example of a software package. Zip files, .exe files, .app files, and RPM packages are other examples of software packages. Still, there are a myriad of other software packages used in software development and the present arrangements are not limited to these examples.

As used herein, the term "test plan" means a document or file describing a scope of testing to be performed on a software package and activities to be performed by the software package during the testing, for example as part of software package validation. For example, a test plan can describe the scope, approach, resources and schedule of intended test activities, as well as the test environment.

As used herein, the term "requirement collection" means a collection of requirements established for a software package. A requirement can, for example, specify the nature of a test result that should be obtained when the software package is executed, specify resources that should be used by the software package during execution, and the like.

As used herein, the term "test case" means a set of conditions or variables imposed on a software package during execution for testing purposes.

As used herein, the term "test result" means a result generated by a software package during execution of the software package for testing purposes.

As used herein, the term "test execution record" means a set of data pertaining to execution of a software package using a particular test case, which are gathered during such execution. A test execution record can, for example, indicate resources accessed during execution (e.g., other software packages), exceptions and/or errors that are generated, test results, and the like.

FIG. 1 is a block diagram illustrating a system 100 for determining a quality of a software package in accordance with one embodiment disclosed within this specification. The system 100 can include an asset management system 102, a requirements management system 104 and a quality management system 106. The asset management system 102, requirements management system 104 and quality management system 106 can be implemented as computer-usable or computer-readable program code, which may be stored on a computer-readable storage medium, executable by one or more processors to perform various processes and method described herein.

The asset management system 102 can store or otherwise provide a software package 110 to be validated. The requirements management system 104 can provide a test plan 112 for the software package 110. The test plan 112 can, for example, describe the scope, approach, resources and schedule of intended test activities, as well as the test environment, to be used for testing the software package 110.

The quality management system 106 can execute the software package 110 in accordance with the test plan 112 using at least one test case 114, 116, 118 that corresponds to a requirement collection 120. In illustration, the requirement collection 120 can specify one or more requirements 122, 124 for the software package 110, and the test cases 114-118 can specify conditions or variables imposed on the software package 110 during execution. For example, the test cases 114-118 can specify variables to be used by the software package 110 during execution, other software packages to be accessed by the software package 110 during execution, and/or the like. The test cases 114-118 can be generated, either automatically or by a user, to conform to the test plan 112. The requirement collection 120 can be stored by the requirements management system 104, and link to the quality management system 106 via linked data.

In one arrangement, the software package 110 can be executed as a stand-alone application or utility, though the software package 110 may access other software packages during execution. In another arrangement, the software package 110 can be executed as a component of a larger software package, in which case execution of the software package 110 may entail executing the larger software package.

During execution of the software package 110, the software package 110 can be linked, via linked data, to the test plan 112 and the requirement collection 120. Further, via linked data, the software package 110 can link to other software packages and/or data from various systems. Accordingly, other sources can be easily connected to the software package 110 and queried during execution. In one arrangement, such links can be implemented in accordance with Open Services for Lifecycle Collaboration (OSLC), though the present arrangements are not limited in this regard.

When the software package 110 is executed using the test case 114, a test execution record 130 and a test result 132 can be generated. The test execution record 130 can indicate resources accessed by the software package 110 during execution (e.g., other software packages), exceptions and/or errors that are generated, the test results 132, and the like. The test execution record 130 can be associated with the test case 114, for example using linked data. Similarly, when the software package 110 is executed using the test case 116, a test execution record 134 and a test result 136 can be generated. The test execution record 134 can be associated with the test case 116, for example using linked data. In the example presented in FIG. 1, the software package 110 is not executed using the test case 118. This example is presented merely for purposes of explanation and does not represent a limitation on the present arrangements.

Based on the execution of the software package 110 in accordance with the test plan 112 and the various test cases 114-118, a package quality score 140 can be determined and assigned to the software package 110. By way of example, if the test result 132 indicates that the software package 110, when executed using the test case 114, passed testing, +2 points can be assigned to the test result 132. Further, if the test execution record 130, which may include the test result 132, indicates that the requirement 122 for the software package 110 has been resolved when using the test case 114 for execution of the software package 110, +5 points can be assigned to the test case 114. If the test result 136 indicates that the software package 110, when executed using the test case 116, did not pass testing, −2 points can be assigned to the test result 136. Further, if the test execution record 134, which may include the test result 136, indicates that the requirement 124 for the software package 110 has not been resolved when using the test case 116 for execution of the software package 110, −5 points can be assigned to the test case 116. If no execution record for the test case 118 is generated for execution of the software package 110 using the test case 118 (e.g., the software package 110 was not executed using the test case 118), −1 point can be assigned to the test case 118 based on the lack of a corresponding test execution record. In one arrangement, SPARQL Protocol and RDF Query Language (SPARQL) can be used to generate the scores across OSLC linked resources, though the present arrangements are not limited in this regard.

Links generated between the test result 132, 136, the test cases 114-118 and the software package 110, via the linked data, can be automatically traversed to identify the points assigned to the test results 132, 136 and test cases 114-118. The package quality score 140 for the software package 110 can be computed from these points. For example, the points can be summed to calculate the package quality score 140. In this example, the package quality score is −1 point.

The package quality score 140 can provide an indication of the overall quality of the software package 110, and can be associated with the software package 110. For example, the package quality score 140 can be associated with the software package 110 as metadata associated with the software package 110. Thus, a software developer or a user can evaluate the package quality score 140 to arrive at a decision as to whether it is desirable to use the software package 110. In illustration, software developers or users may avoid using software packages with low, or negative, package quality scores, and select software packages that have acceptable package quality scores. For example, if a software developer is developing an application and requires a software package to perform certain functions, the software developer can evaluate a number of software packages, and choose the software package having a high package quality score while avoiding software packages that do not. Similarly, if a user is searching for a particular type of application to install on a client device, the user can evaluate a number of software packages, and choose the software package having a high package quality score while avoiding software packages that do not.

The package quality score 140 can be presented to a user in any suitable manner. For example, when a user who is contemplating on using the software package 110 selects the software package 110, for example from a list of software packages, metadata associated with the software package 110 that indicates the package quality score 140 can be presented to the user. When a user, such as a test engineer or developer who is testing the software package 110 selects the software package 110, the package quality score 140 can be presented in a similar manner. Such user, however, further can select the software package 110 or the package quality score 140 to obtain further information about the testing of the software package 110 following the test plan 112. Such further information can include the test execution records 130, 134, the test results 132, 136, the test cases 114-118, the points assigned for the test results 132, 136 and the test cases 114-118, or any other suitable information. Indeed, the user can, via a suitable user interface, cursively select pieces of information to arrive at the information the user desires (e.g., drill down to desired information).

Figure 2:
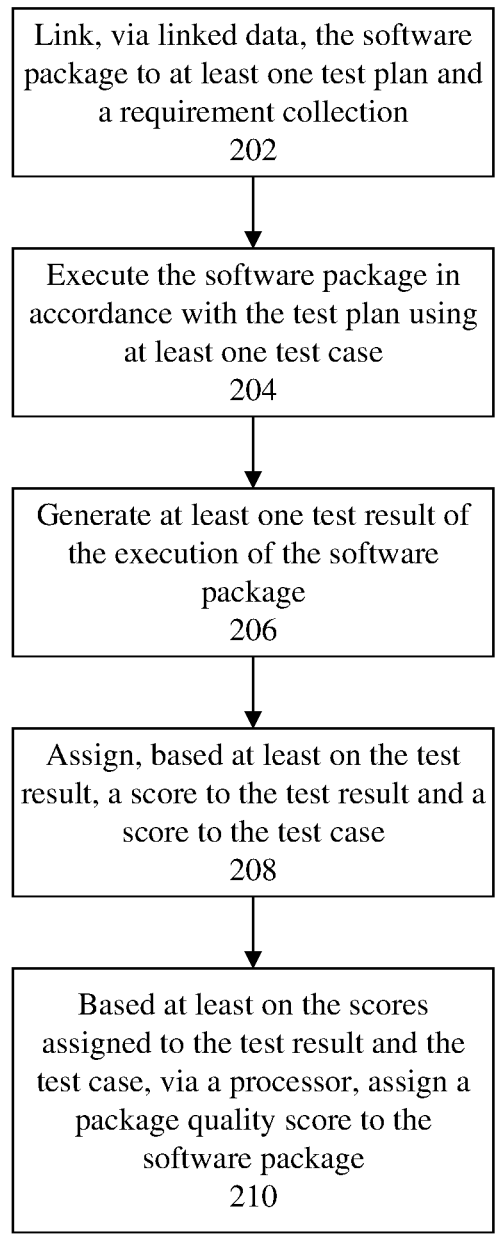
FIG. 2 is a flow chart illustrating a method of determining a quality of a software package in accordance with another embodiment disclosed within this specification.

FIG. 2 is a flow chart illustrating a method 200 of determining a quality of a software package in accordance with another embodiment disclosed within this specification. At step 202, the software package can be linked to at least one test plan and a requirement collection via linked data. At step 204, the software package can be executed in accordance with the test plan using at least one test case. At step 206, at least one test result of the execution of the software package can be generated. At step 208, a score can be assigned to the test result and a score can be assigned to the test case based on the test result. At step 210, based at least the scores on assigned to the test result and the test case, via a processor, a package quality score can be assigned to the software package.

Figure 3:
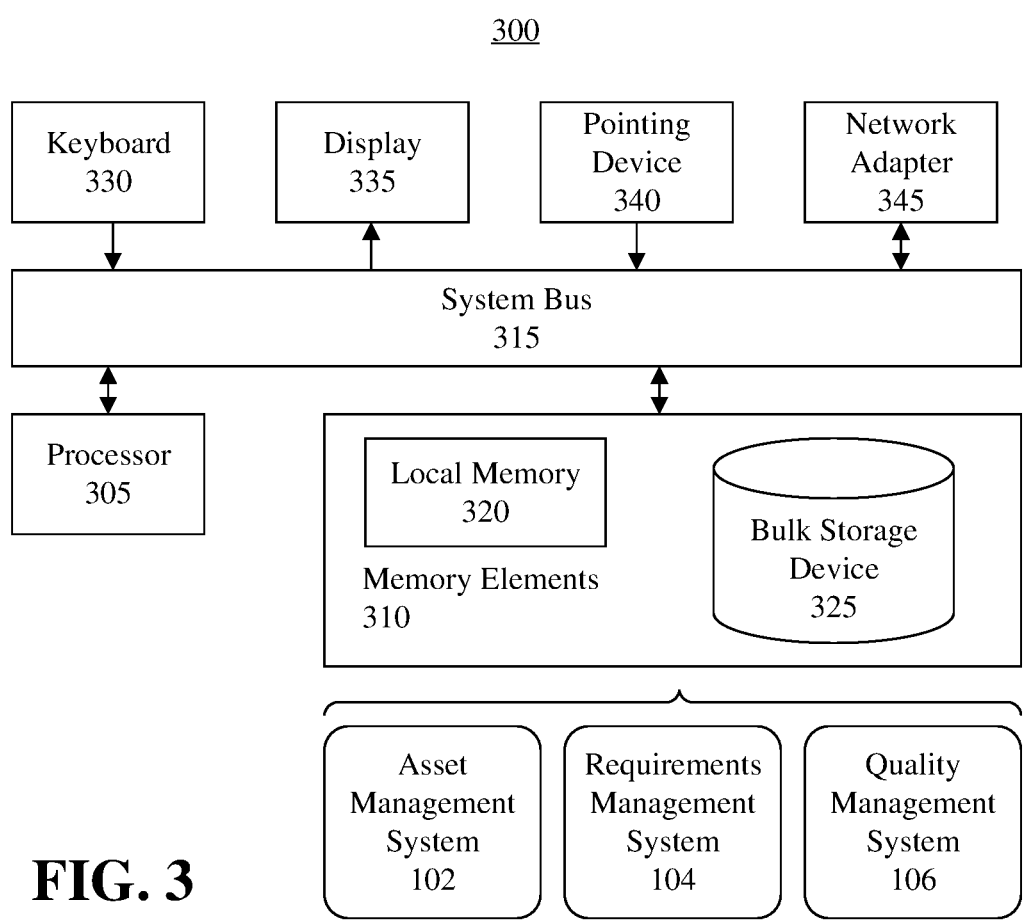
FIG. 3 is a flow chart illustrating a processing system that determines a quality of a software package in accordance with another embodiment disclosed within this specification.

FIG. 3 is a flow chart illustrating a processing system 300 that determines a quality of a software package in accordance with another embodiment disclosed within this specification. The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a computer, a workstation, a mobile computer, a laptop computer, tablet computer, a smart phone, a personal digital assistant, a gaming device, an appliance, and so on.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 can be coupled to the processing system 300. The I/O devices can be coupled to the processing system 300 either directly or through intervening I/O controllers. For example, the display 330 can be coupled to the processing system 300 via a graphics processing unit (GPU), which may be a component of the processor 305 or a discrete device. One or more network adapters 345 also can be coupled to processing system 300 to enable processing system 300 to become coupled to other systems, computer systems, remote printers, and/or remote storage devices through intervening private or public networks. Modems, cable modems, transceivers, and Ethernet cards are examples of different types of network adapters 345 that can be used with processing system 300.

As pictured in FIG. 3, the memory elements 310 can store the components of the system 100 of FIG. 1, namely the asset management system 102, requirements management system 104 and quality management system 106. Being implemented in the form of executable program code, these components of the system 100 can be executed by the processing system 300 and, as such, can be considered part of the processing system 300. Moreover, the asset management system 102, requirements management system 104 and quality management system 106 are functional data structures that impart functionality when employed as part of the processing system of FIG. 3. The software package 110, test plan 112, test cases 114-118, test execution records 130, 134, test results 132, 136 and requirement collection 120 of FIG. 1, being processed by and/or generated by the processing system 300, also are functional data structures that impart functionality when employed as part of the processing system 300 of FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method comprising:
    linking, via linked data, a software package to at least one test plan and a requirement collection, wherein the linked data publishes the at least one test plan and the requirement collection, wherein the linked data is a method of publishing structured data so that it is interlinked;
    executing the software package in accordance with the test plan using at least one test case;
    generating at least one test result of the execution of the software package;
    assigning, based at least on the test result, a score to the test result;
    assigning, based at least on the test result, a score to the test case, the score assigned to the test case being distinct from the score assigned to the test result;
    automatically traversing links generated via the linked data between the test result, the test case and the software package to identify the scores assigned to the test result and the test case; and
    based at least on the scores assigned to the test result and the test case, via a processor, computing a package quality score from at least the scores assigned to the test result and the test case and assigning the package quality score to the software package.

2. The method of claim 1, wherein assigning the score to the test case comprises:
    determining whether the test result indicates that a requirement specified in a requirement collection is resolved during execution of the software package using the at least one test case; and
    assigning the score to the test case based on whether the test result indicates that the requirement for the test case is resolved.

3. The method of claim 2, further comprising:
    generating at least one test execution record corresponding to the test case;
    wherein determining whether the test result indicates that the requirement specified in a requirement collection is resolved comprises processing the test execution record.

4. The method of claim 1, wherein:
    executing the software package comprises executing the software package in accordance with the test plan using a plurality of test cases that correspond to the requirement collection;
    generating the at least one test result of the execution of the software package comprises generating a plurality of test results of the execution of the software package, each test result corresponding to execution of the software package using a respective test case;
    assigning the score at least to the test result and the score to the test case comprises assigning scores to each of the respective test results and test cases; and
    the package quality score assigned to the software package is based on the scores assigned to each of the respective test results and test cases.

5. The method of claim 1, further comprising:
    assigning a score to at least one test case for which an execution record has not been generated, the score based on a lack of the corresponding execution record;
    wherein assigning the package quality score to the software package further is based on the score assigned to the at least one test case for which the execution record has not been generated.

6. The method of claim 1, wherein assigning the package quality score to the software package associating the package quality score with the software package as metadata associated with the software package.

* * * * *